(12) United States Patent
Chu et al.

(10) Patent No.: US 10,660,105 B2
(45) Date of Patent: May 19, 2020

(54) SYSTEMS AND METHODS FOR MULTI-USER OPERATION WITH DUPLEX MEDIUM ACCESS CONTROL

(71) Applicant: Marvell World Trade Ltd., St. Michael (BB)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/149,825

(22) Filed: Oct. 2, 2018

(65) Prior Publication Data
US 2019/0104513 A1 Apr. 4, 2019

Related U.S. Application Data

(60) Provisional application No. 62/566,997, filed on Oct. 2, 2017.

(51) Int. Cl.
| | | |
|---|---|---|
| *H04W 72/04* | (2009.01) | |
| *H04W 74/08* | (2009.01) | |
| *H04W 28/06* | (2009.01) | |
| *H04W 74/06* | (2009.01) | |
| *H04W 84/12* | (2009.01) | |

(52) U.S. Cl.
CPC ......... *H04W 72/048* (2013.01); *H04W 28/06* (2013.01); *H04W 72/042* (2013.01); *H04W 74/06* (2013.01); *H04W 74/0816* (2013.01); *H04W 84/12* (2013.01)

(58) Field of Classification Search
CPC .......................... H04L 5/0007; H04W 72/1205
See application file for complete search history.

(56) References Cited

U.S. PATENT DOCUMENTS

| | | | | |
|---|---|---|---|---|
| 2015/0365940 | A1* | 12/2015 | Chu | H04B 7/0452 370/329 |
| 2016/0285608 | A1* | 9/2016 | Kwon | H04L 5/0055 |
| 2016/0366701 | A1* | 12/2016 | Chu | H04W 74/0816 |
| 2017/0170932 | A1* | 6/2017 | Chu | H04B 7/0452 |
| 2017/0195991 | A1* | 7/2017 | Ahn | H04L 47/2416 |
| 2017/0223665 | A1* | 8/2017 | Chun | H04L 27/26 |
| 2017/0223734 | A1* | 8/2017 | Lin | H04L 29/06 |
| 2018/0084548 | A1* | 3/2018 | Min | H04L 5/0073 |
| 2018/0184409 | A1* | 6/2018 | Min | H04L 5/0007 |
| 2018/0213566 | A1* | 7/2018 | Baron | H04W 72/1242 |
| 2019/0116553 | A1* | 4/2019 | Kim | H04W 52/0229 |
| 2019/0159143 | A1* | 5/2019 | Li | H04W 52/367 |
| 2019/0268850 | A1* | 8/2019 | Kim | H04W 52/0229 |

* cited by examiner

*Primary Examiner* — Melanie Jagannatthan

(57) ABSTRACT

Embodiments described herein provide a method for establishing multi-user operation with duplex medium access control in a wireless local area network. Specifically, a trigger frame is transmitted to one or more client stations in a wireless local area network. In response to transmitting the trigger frame, one or more uplink data packets are received from the one or more client stations. It is then determined whether the one or more client stations support duplex operation. A downlink data packet configured in a multi-user data format is transmitted to at least one destined client station that supports duplex operation while simultaneously receiving the one or more uplink data packets from the one or more client stations.

20 Claims, 5 Drawing Sheets

SYSTEMS AND METHODS FOR MULTI-USER OPERATION WITH DUPLEX MEDIUM ACCESS CONTROL

CROSS-REFERENCE TO RELATED APPLICATION

This disclosure claims the benefit under 35 U.S.C. § 119(e) of U.S. Provisional Patent Application No. 62/566,997, filed on Oct. 2, 2017, which is hereby incorporated by reference herein in its entirety.

FIELD OF USE

This disclosure relates to media access control (MAC) in a wireless local area network (WLAN), and specifically, to multi-user operation with duplex MAC in WLANs.

BACKGROUND OF THE DISCLOSURES

In 802.11 standards for WLANs, the MAC sublayer provides flow control and multiplexing for the transmission medium. Specifically, when sending data to another device on the network, the MAC protocol controls when data is sent, and whether a waiting period is necessary to avoid congestion and collisions from other transmissions that attempt to compete for the same transmission medium. Existing 802.11 standards define a half-duplex medium access for downlink and uplink transmissions. For example, for an access point that communicates with multiple client stations in a WLAN, downlink transmission and uplink transmission are not permitted to happen simultaneously under the current 802.11 standards, because noise cancellation is difficult when downlink transmission and uplink transmission occupies the same channel. Data transmission throughput in the WLAN is thus conventionally limited as downlink and uplink transmission have to take turns to occur.

SUMMARY

Embodiments described herein provide a method for establishing multi-user operation with duplex medium access control in a wireless local area network. Specifically, a trigger frame is transmitted to one or more client stations in a wireless local area network. In response to transmitting the trigger frame, one or more uplink data packets are received from the one or more client stations. It is then determined whether the one or more client stations support duplex operation. A downlink data packet configured in a multi-user data format is transmitted to at least one destined client station that supports duplex operation while simultaneously receiving the one or more uplink data packets from the one or more client stations.

In some implementations, in response to determining that the one or more client stations support duplex operation, the downlink data packet is configured as a downlink multi-user Physical Layer Convergence Protocol (PLCP) protocol data unit (PPDU) that is destined at the one or more client stations.

In some implementations, transmission of the one or more uplink data packets and transmission of the downlink data packet starts at a first same time and ends at a second same time.

In some implementations, in response to receiving the one or more uplink data packets, a downlink acknowledgement message is received. An uplink acknowledgement message is received from the one of the one or more client stations in response to transmitting the downlink data packet, while the downlink acknowledgement message is being transmitted.

In some implementations, a subchannel is allocated to the one of the one or more client stations that supports duplex transmission for both uplink transmission and downlink transmission.

In some implementations, a first subchannel is allocated to the one of the one or more client stations that supports duplex transmission for uplink transmission. A second subchannel is allocated different from the first subchannel to the one of the one or more client stations for downlink transmission.

In some implementations, the transmission of the downlink data packet to the one of the one or more client stations is deferred until a first uplink multi-user data packet from the one of the one or more client stations is detected to avoid collision with a second uplink multi-user data packet from another client station.

In some implementations, a channel clear assessment checking is announced before transmitting the downlink data packet configured in a multi-user data format to one of the one or more client stations to avoid collision with other uplink multi-user data packets from another client station.

In some implementations, the downlink data packet configured in a multi-user data format includes trigger information that solicits an uplink multi-user data aggregated medium access control protocol data unit (A-MPDU).

In some implementations, duplex multi-user transmission is cascaded by transmitting another downlink data packet while receiving another uplink transmission, after the transmission of the downlink data packet while receiving the one or more uplink data packets.

Embodiments described herein further provides a network device configured for establishing multi-user operation with duplex medium access control in a wireless local area network. The network device includes memory and a wireless transceiver. The wireless transceiver is configured to transmit a trigger frame to one or more client stations in a wireless local area network, and in response to transmitting the trigger frame, receive one or more uplink data packets from the one or more client stations. The network device further includes a processor configured to determine whether the one or more client stations support duplex operation. The wireless transceiver is further configured to transmit a downlink data packet configured in a multi-user data format to at least one destined client station that supports duplex operation while simultaneously receiving the one or more uplink data packets from the one or more client stations.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for multi-user operation with duplex medium access control (MAC) in an 802.11 wireless local area network (WLAN).

In existing 802.11 standards for WLANs, the MAC control protocol typically does not permit simultaneous downlink and uplink transmissions because of difficulties in noise cancellation when downlink and uplink transmissions share the same wireless channel. For example, in a WLAN, when a client station transmits a packet to an access point (uplink), the access point needs to wait until the end of the transmission, send an acknowledgement to the client station, and subsequently wait for a back-off period until the channel is cleared, and then can start downlink transmission to the client station. Similarly, when the access point transmits data to the client station (downlink), no uplink transmission can be performed at the same time as the downlink transmission—all other client stations need to wait for the downlink transmission from the access point to end, before the access point can receive any uplink transmission. This half-duplex transmission scheme in a traditional WLAN has severely limited data throughput of the network. In particular, for 802.11ax in which various multi-user operations are defined, such as downlink orthogonal frequency division multiple access (OFDMA), downlink multi-user multiple-input multiple-output (MIMO), downlink OFDMA and MIMO, uplink OFDMA, uplink multi-user MIMO, and uplink OFDMA and MIMO, and/or the like, the half-duplex (downlink or uplink only) transmission scheme can be highly inefficient to serve the transmission requirement of multiple client stations in the WLANs.

Embodiments described herein provide a MAC control scheme that allows duplex transmission in WLANs. For example, uplink transmission from a client station to the access point and downlink transmission from the access point to the client station (or another client station) may be performed simultaneously. Subsequently, acknowledgement messages can be exchanged simultaneously in a bi-directional way. The downlink and uplink multi-user data frames may start simultaneously following a trigger frame and end at the same time. The MAC frame headers for the duplex transmission are discussed in commonly owned U.S. Pat. No. 9,450,743, issued on Sep. 20, 2018, which is expressly incorporated herein by reference in its entirety.

Figure 1:
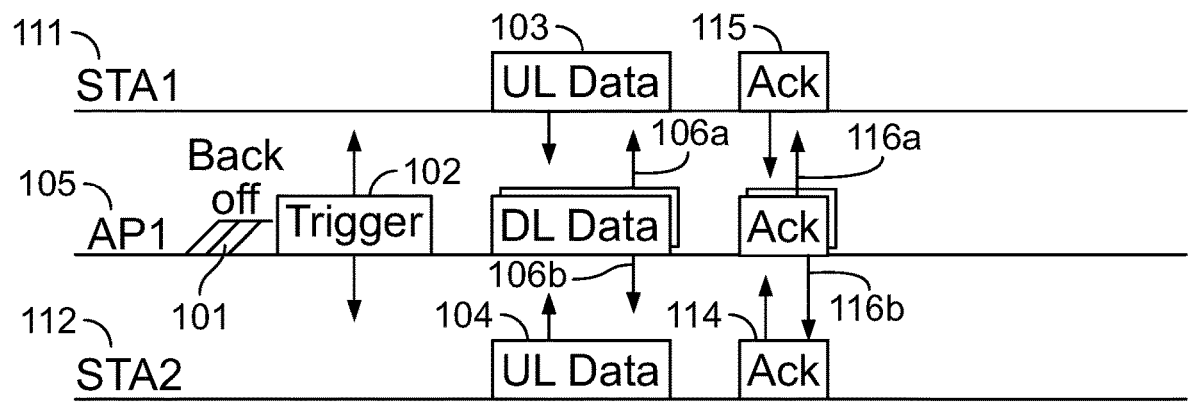
FIG. 1 provides a block diagram illustrating aspects of duplex transmission with multi-user operation, according to an embodiment described herein.

FIG. 1 provides a block diagram 100 illustrating aspects of duplex transmission with multi-user operation, according to an embodiment described herein. Diagram 100 shows a WLAN having an access point 105 and client stations 111-112. To initiate duplex transmission, after a back-off time period 101 to wait for the channel to be cleared, the access point 105 sends a trigger frame 102 to the client stations 111-112 to trigger uplink transmission. The access point 105 decides whether to initiate duplex multi-user transmission after sending the trigger frame 102. If the access point 105 decides to initiate duplex transmission, the access point 105 may configure downlink data frame in the form of a multi-user Physical Layer Convergence Protocol (PLCP) protocol data unit (PPDU), which are destined at the client stations that support duplex operation. Specifically, downlink data may be transmitted from the access point 105 to client stations 111-112 in the form of downlink multi-user PPDUs 106a-b, while uplink transmission can be initiated at the same time. For example, uplink high-efficiency (HE) trigger-based (TB) PPDUs 103 and 104 may be transmitted, from the client stations 111-112, respectively, to the access point 105 at the same time. In one embodiment, each of the downlink multi-user PPDUs 106a-b and the uplink HE-TB PPDUs 103 and 104 end at the same time.

In some embodiments, the client stations 111-112, upon receiving the trigger frame 102, may perform clear channel assessment (CCA) sensing to determine whether the channel is idle for transmission, if the trigger frame 102 indicates that the CCA sensing is required prior to any uplink transmission.

In some embodiments, after the end of uplink and downlink data transmission 103, 104, 106a-b, acknowledgement messages may be sent to acknowledge receipt of the data. For example, client station 111 may send acknowledgement 115 to acknowledge receipt of downlink PPDU 106a; client station 112 may send acknowledgement 114 to acknowledge downlink PPDU 106b; and the access point may send the acknowledgement messages 116a-b to acknowledge uplink PPDUs 103 and 104, respectively. The downlink acknowledgement 116a-b and uplink acknowledgement 103-104 may start simultaneously but may have different lengths and do not end at the same time necessarily.

In some embodiments, when there is only one client station in the WLAN, e.g., client station 112 does not exist, the duplex transmission described at diagram 100 still applies, except that the access point 105 may transmit downlink data 106a in the form of single-user PPDUs.

Bandwidth for downlink or uplink transmission may be shared among the client stations 111-112. For example, each client station may be allocated to the same downlink and uplink subchannel (a resource unit). Or alternatively, each client station may have a different downlink and uplink subchannel (resource unit). For example, the downlink resource unit of a client station is covered by the uplink resource unit of the client station, e.g., downlink transmission to the client station is allocated a resource unit that is a subset of the uplink resource unit allocated to the client. For example, the uplink resource unit of a client station is covered by the downlink resource unit of the client station, e.g., uplink transmission to the client station is allocated a resource unit that is a subset of the downlink resource unit allocated to the client station. Or alternatively, for another example, the uplink resource unit and the downlink resource unit allocated to the client station may overlap with but do not contain each other.

Figure 2:
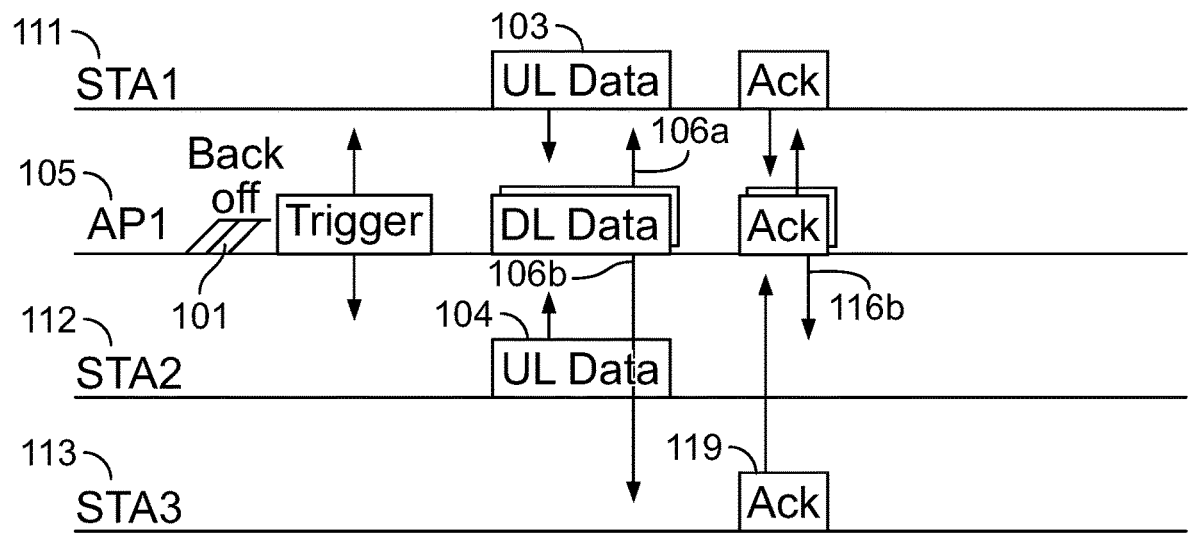
FIG. 2 provides a block diagram illustrating aspects of the start of duplex transmission with multi-user operation discuss in FIG. 1, according to an embodiment described herein.

FIG. 2 provides a block diagram illustrating aspects of the start of duplex transmission with multi-user operation discuss in FIG. 1, according to an embodiment described herein. Diagram 200 shows a duplex transmission with multi-user operation when a new client station 113 joins the WLAN having the access point 105 and client stations 111-112 (as illustrated in diagram 100 in FIG. 1). The new client station 113 may join WLAN to initiate downlink or uplink transmission.

In some embodiments, client stations that join the uplink multi-user operation are the same as client stations that join downlink multi-user operation, e.g., each new client station may join both the uplink and downlink multi-user operation. In some embodiments, client stations that join the uplink multi-user operation may overlap, but may be different from the group of client stations that join the downlink multi-user operation. In this case, if a downlink multi-user destination can receive the uplink transmission from another client station, collision may occur. For example, as shown at diagram 200, if client station 113 joins as a downlink multi-user destination, the client station 113 may also receive the uplink transmission 104 from client station 112, collision may occur as client station 113 may not be able to correctly receive the downlink multi-user PPDU 106c from the access point 105.

To start duplex downlink multi-user transmission and to avoid collision (e.g., between downlink transmission 106c and uplink transmission 104 as described above), the access point 105 may defer the downlink multi-user duplex transmission 106c until uplink transmission from the client station 113 is detected, e.g., after the legacy PHY-SIG and/or an 802.11ax PHY-ISIG is correctly received and detected from an uplink transmission. In this way, the client station 113 may have a higher chance to correctly receive the downlink transmission 106c without colliding with the uplink transmission 104 from the client device. Alternatively, the transmission of downlink multi-user duplex PPDU and the transmission of uplink multi-user duplex PPDU may start at the same time and end at the same time, as shown in the example at diagram 200. Or the access point 105 may schedule a default time for the downlink transmission 106c to start if no uplink transmission is received from the client station 113 within a period of time, meaning the client station 113 may be busy.

Figure 3:
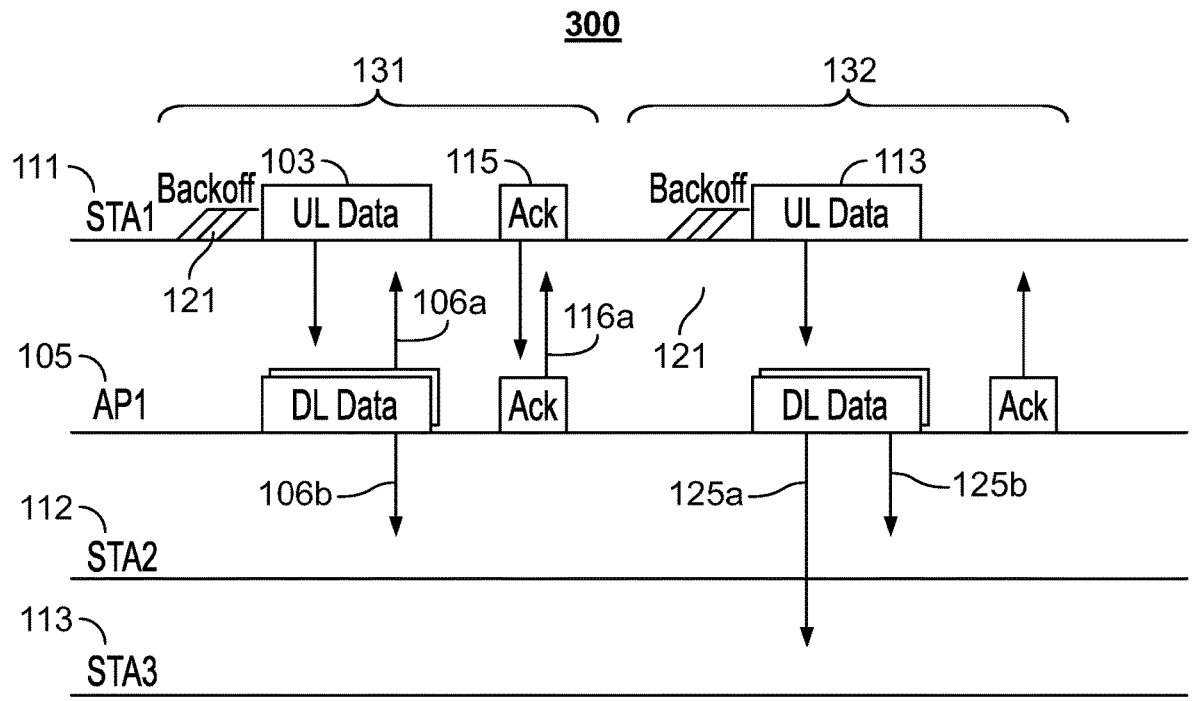
FIG. 3 provides a block diagram illustrating aspects of an alternative way to start of downlink duplex multi-user transmission, according to an embodiment described herein.

FIG. 3 provides a block diagram illustrating aspects of an alternative way to start of downlink duplex multi-user transmission, according to an embodiment described herein. Diagram 300 shows that, after a back-off period 121, a client station (e.g., 111) may initiate an uplink transmission first (e.g., 103). After the access point 105 receives the uplink PPDU at 103, the access point 105 may determine whether the client station 111 supports duplex transmission. The access point 105 then figures out that the access point is the destined device, and the PPDU length from the received PPDU from the uplink transmission (e.g., 103). The access point 105 may then transmit downlink multi-user PPDUs 106a-b to client stations which include a TXOP initiator. Acknowledgement messages 115 and 116a may be exchanged between the access point and the client stations, respectively. The process 131 may be repeated after a back-off period 122, e.g., in process 132, duplex downlink multi-user transmissions 125a-125b may be launched in a similar way, after the access point 105 receives the initiating uplink multi-user PPDU 113.

In diagram 300, as client stations 112 and 113 may receive PPDUs from both client station 123 and the access point 105, the client stations 112-113 may not receive the downlink multi-user PPDUs (e.g., 125a-b) correctly.

Figure 4:
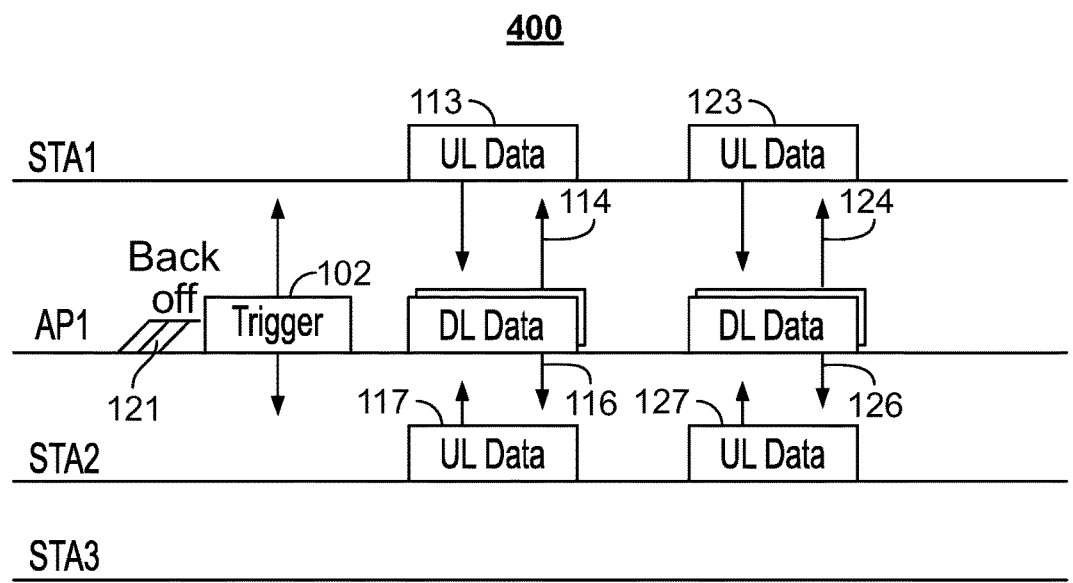
FIG. 4 provides a block diagram illustrating aspects of duplex transmission with multi-user cascading, according to an embodiment described herein.

FIG. 4 provides a block diagram illustrating aspects of duplex transmission with multi-user cascading, according to an embodiment described herein. Diagram 400 shows that after a back-off period 121 to clear the channel and a subsequent trigger frame 102 from the access point 121, duplex uplink transmission and downlink transmission may be "cascaded." For example, the downlink multi-user PPDUs 114 and 116 may solicit an uplink multi-user data aggregated MAC protocol data unit (MPDU). Thus, duplex multi-user transmission may be combined with multi-user cascading operation, e.g., uplink transmission 113, 117 together with downlink transmissions 114, 116 may be repeated as uplink transmissions 123, 127 and downlink transmissions 124 and 126.

Figure 5:
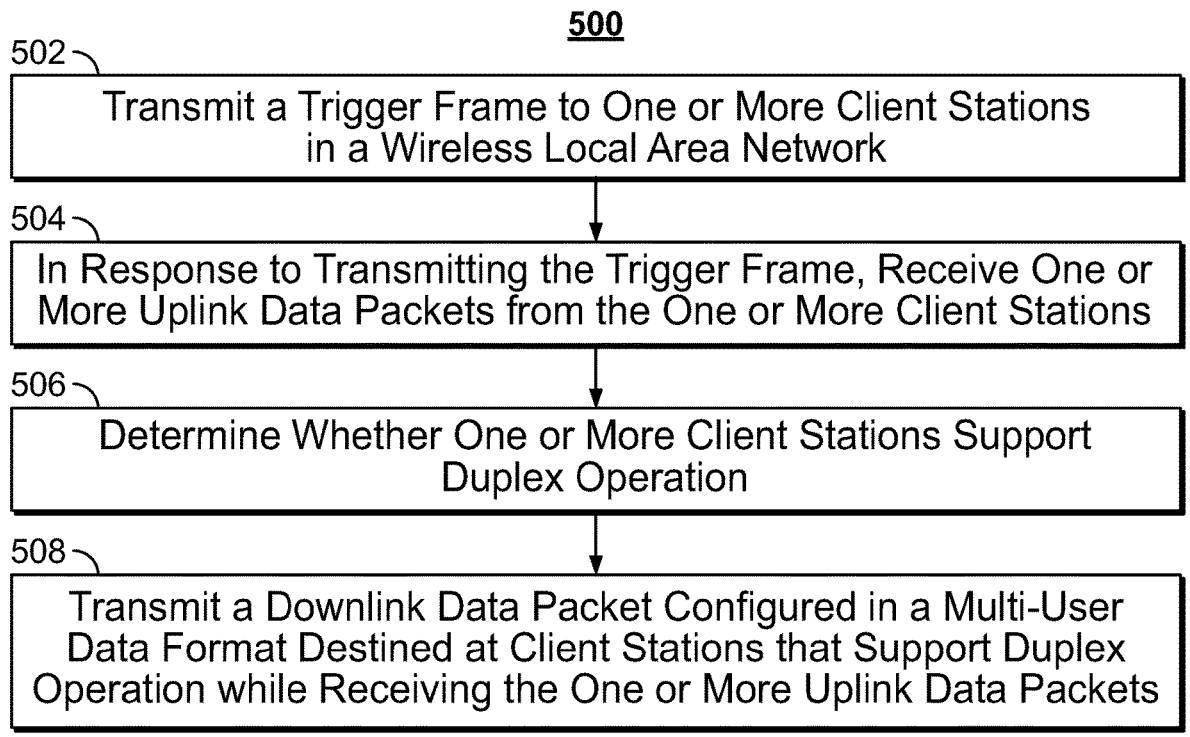
FIG. 5 shows an example logic flow diagram illustrating aspects of establishing duplex transmission with multi-user operation in a WLAN as described in relation to FIGS. 1-4, according to embodiments described herein.
Figure 6:
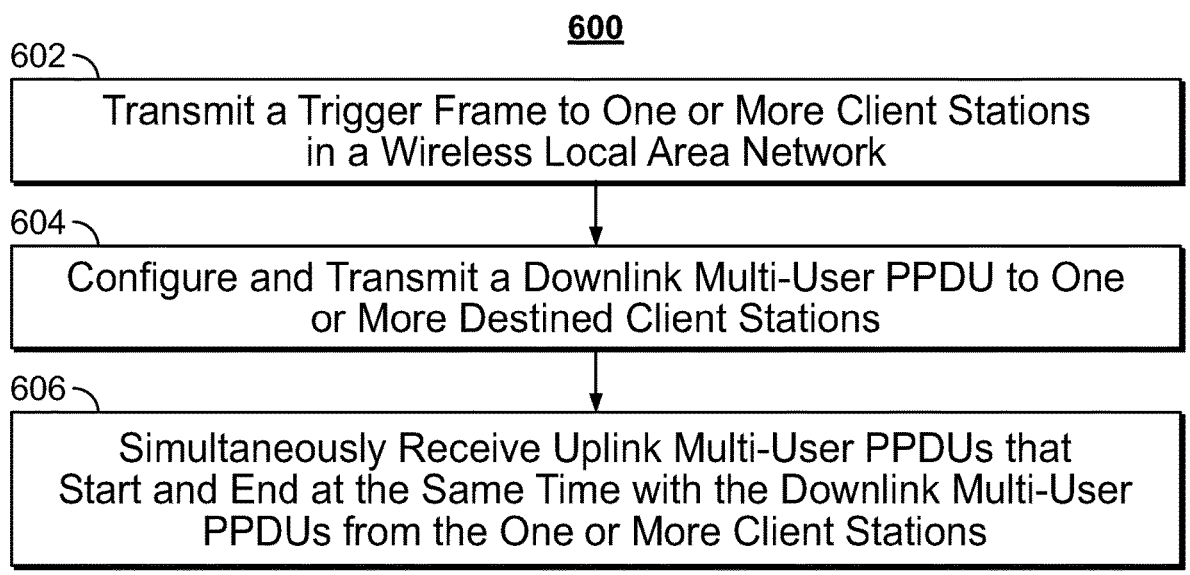
FIG. 6 provides an example logic flow diagram illustrating establishing uplink and downlink multi-user transmission at the same time, according to embodiments described herein.
Figure 7:
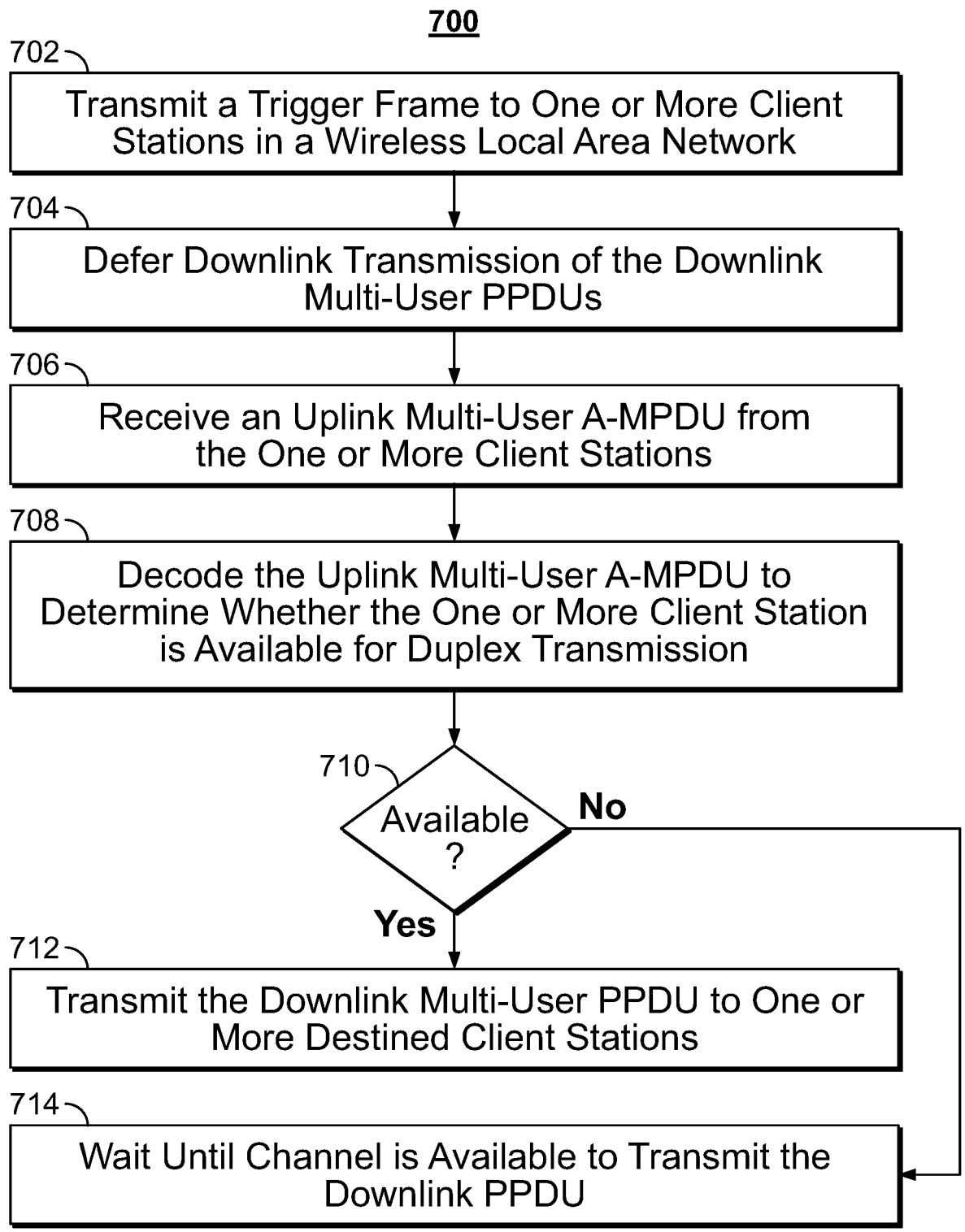
FIG. 7 provides an example logic flow diagram illustrating starting downlink multi-user transmission to avoid collision with uplink transmission destined at the access point in a WLAN, according to embodiments described herein.

FIGS. 5-7 show example logic flow diagrams illustrating various aspects of establishing duplex transmission with multi-user operation in a WLAN as described in relation to FIGS. 1-4, according to embodiments described herein. Processes 500-800 may be implemented at a wireless communication device (805 in FIG. 8) that is operated in compliance with the 802.11 standard, e.g., 802.11ax, 802.11az, etc.

In diagram 500, at 502, an access point in a WLAN may transmit a trigger frame to one or more client stations in the WLAN, e.g., see trigger frame 102 transmitted from access point 105 to client stations 111-112 in FIG. 1. At 504, in response to transmit the trigger frame, the access point may receive one or more uplink data packets (e.g., see 103, 104 in FIG. 1) from the one or more client stations. At 506, the access point may determine whether one or more client stations support duplex operation, and transmit a downlink data packet (e.g., 106a, 106b in FIG. 1) configured in a multi-user data format destined to client stations that support duplex operation while receiving the one or more uplink data packets.

FIG. 6 provides an example logic flow diagram illustrating establishing uplink and downlink multi-user transmission at the same time, according to embodiments described herein. At 602, the access point may transmit a trigger frame (e.g., 102 in FIG. 1) to one or more client stations in a wireless local area network. At 604, the access point may configure and transmit a downlink multi-user PPDU to one or more destined client stations. At 606, the access point may simultaneously receive uplink multi-user PPDUs that start and end at the same time with the downlink multi-user PPDUs from the one or more client stations.

FIG. 7 provides an example logic flow diagram illustrating starting a downlink multi-user transmission to avoid collision with an uplink transmission destined to the access point in a WLAN, according to embodiments described herein. At 702, the access point may start with transmitting a trigger frame to one or more client stations in the WLAN, and but then defer downlink transmission of the downlink multi-user PPDUs at 704. For example, as shown in FIG. 2, when client station 113 is a destination for downlink multi-user PPDU 106c but client station 113 can also receive the uplink transmission 104, collision may occur. Thus, the access point 105 may defer the transmission of downlink PPDU 106c.

At 706, the access point may receive an uplink multi-user A-MPDU from the one or more client stations, and decode the uplink multi-user A-MPDU to determine whether the one or more client station is available for duplex transmission at 708. At 710, if the one or more client station is available for duplex transmission, the access point may transmit the downlink multi-user PPDU to the one or more destined client stations. Alternatively, if the one or more client station is unavailable for duplex transmission, the access point may wait until the uplink multi-user A-MPDU transmission is completed, send the acknowledgement message, and then transmit the downlink PPDU when the channel is clear.

Figure 8:
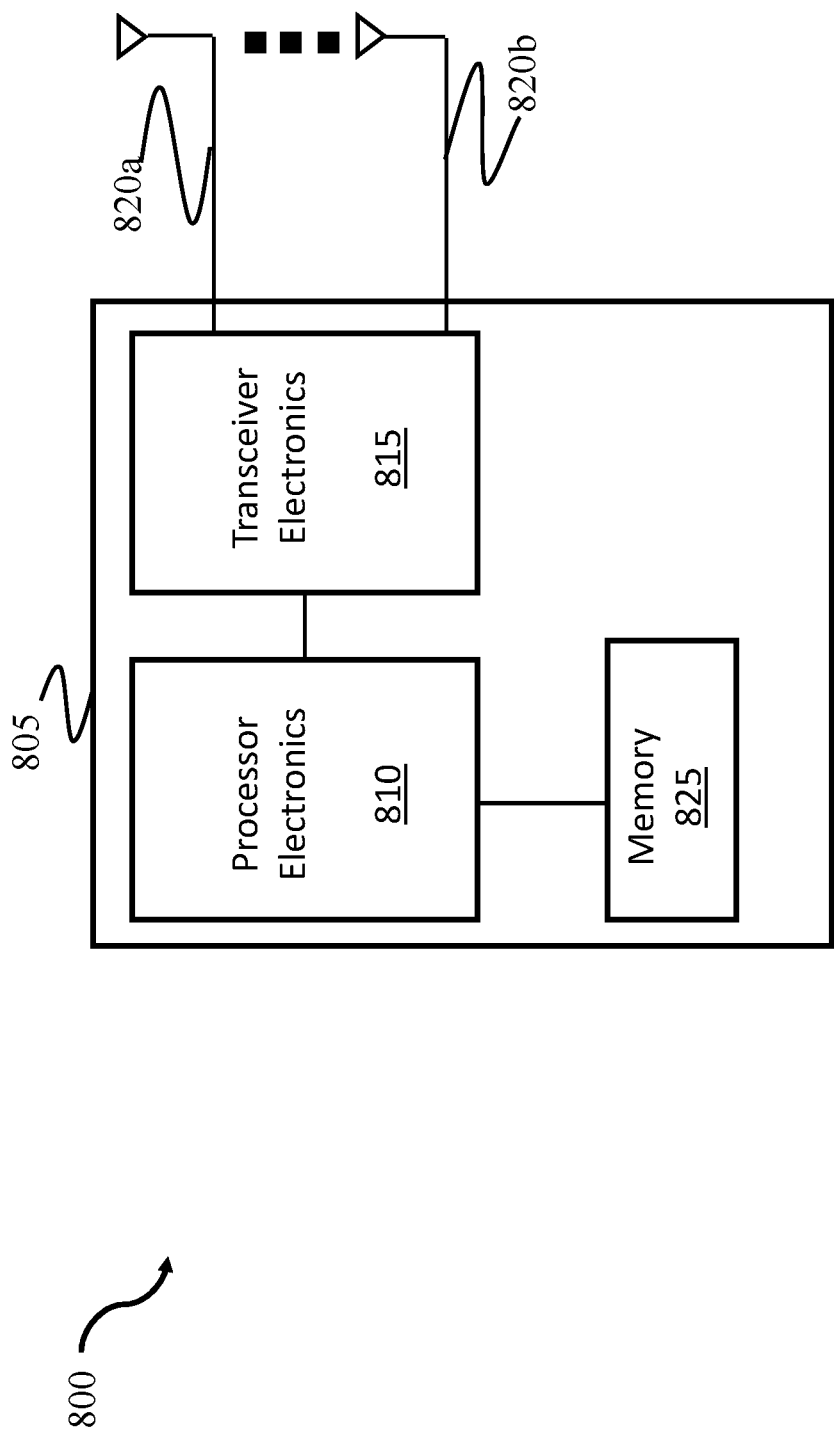
FIG. 8 shows a simplified block diagram 800 of an example of a wireless communication device 805, according to embodiments described herein.

FIG. 8 shows a simplified block diagram 800 of an example of a wireless communication device 805, according to embodiments described herein. Various examples of device 805 include an AP, a base station (BS), a client device, an access terminal (AT), a client station, or a mobile station (MS), and/or the like. For example, the device 805 can represent the access point or the client device discussed throughout FIGS. 1-7.

The device 805 can include processor electronics 810 such as one or more processors that implement methods effecting the techniques presented in this disclosure. The processor electronics 810 can be operable to execute computer-readable instructions that, when executed on the processor electronics 810, cause the device 805 to implement methods (e.g., processes 500-700) effecting the techniques presented in this disclosure. For example, the processor electronics 810 can decode a received uplink A-MPDU to determine whether a client station supports duplex transmission, or to identify a legacy PHY SIG or 802.11 PHY ISIG from the uplink A-MPDU.

The device 805 can include transceiver electronics 815 (e.g., a transmitter, receiver, or transceiver) to send and/or receive wireless signals over one or more antennas 820a-820b. In some embodiments, transceiver electronics 815 can include multiple radio units. In some embodiments, a radio unit includes a baseband unit (BBU) and a radio frequency unit (RFU) to transmit and receive signals. In some embodiments, the device 805 includes dedicated circuitry for transmitting (e.g., a dedicated transmitter) and dedicated circuitry for receiving (e.g., a dedicated receiver). For example, transceiver electronics 815 can include one or more receivers that receive one or more signals from one or more antennas 820a-820b, transmitted over one or more WLAN channels. The transceiver antennas 820a-b and the transceiver electronics 815 are configured to The device 805 can include one or more memories 225 configured to store information such as data and/or instructions (e.g., computer-readable instructions that cause the device 805 to implement methods effecting the techniques presented in this disclosure.

Various embodiments discussed in conjunction with FIGS. 1-8 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., wireless AP, LP devices discussed in relation to FIGS. 1-8), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for establishing multi-user operation with duplex medium access control in a wireless local area network, the method comprising:
   transmitting, from an access point, a trigger frame to one or more client stations in a wireless local area network;
   in response to transmitting the trigger frame, receiving, at the access point, one or more uplink data packets from the one or more client stations;
   determining, at the access point, by decoding each uplink data packet of the one or more uplink packets, whether any of the one or more client stations support duplex operation; and
   transmitting, from the access point, a downlink data packet configured in a multi-user data format to at least one destined client station determined to support duplex operation while simultaneously receiving the one or more uplink data packets from the one or more client stations.

2. The method of claim 1, further comprising:
   in response to determining, at the access point, by decoding each uplink data packet of the one or more uplink data packets, that one or more client stations support duplex operation, configuring the downlink data packet as a downlink multi-user Physical Layer Convergence Protocol (PLCP) protocol data unit (PPDU) that is destined at the one or more client stations.

3. The method of claim 1, wherein transmission of the one or more uplink data packets and transmission of the downlink data packet starts at a first same time and ends at a second same time.

4. The method of claim 1, further comprising:
   in response to receiving, at the access point, the one or more uplink data packets, transmitting, from the access point, a downlink acknowledgement message; and
   receiving, at the access point, an uplink acknowledgement message from the one of the one or more client stations in response to transmitting the downlink data packet, while transmitting the downlink acknowledgement message.

5. The method of claim 1, further comprising:
   allocating, at the access point, a subchannel to the one of the one or more client stations that supports duplex transmission for both uplink transmission and downlink transmission.

6. The method of claim 1, further comprising:
allocating, at the access point, a first subchannel to the one of the one or more client stations that supports duplex transmission for uplink transmission; and
allocating, at the access point, a second subchannel different from the first subchannel to the one of the one or more client stations for downlink transmission.

7. The method of claim 1, further comprising:
deferring transmission of the downlink data packet from the access point to the one of the one or more client stations until a first uplink multi-user data packet from the one of the one or more client stations is detected by the access point to avoid collision with a second uplink multi-user data packet from another client station.

8. The method of claim 1, further comprising:
performing, at the access point, a clear channel assessment checking before transmitting the downlink data packet configured in a multi-user data format to one of the one or more client stations to avoid collision with other uplink multi-user data packets from another client station.

9. The method of claim 1, wherein the downlink data packet configured in a multi-user data format includes trigger information that solicits an uplink multi-user data aggregated medium access control protocol data unit (A-MPDU).

10. The method of claim 9, further comprising:
cascading, at the access point, duplex multi-user transmission by transmitting another downlink data packet while receiving another uplink transmission, after the transmission of the downlink data packet while receiving the one or more uplink data packets.

11. A network device configured for establishing multi-user operation with duplex medium access control in a wireless local area network, the network device comprising:
memory;
a wireless transceiver configured to:
transmit a trigger frame to one or more client stations in a wireless local area network, and
in response to transmitting the trigger frame, receive one or more uplink data packets from the one or more client stations; and
a processor configured to determine, by decoding each uplink data packet of the one or more uplink data packets, whether any of the one or more client stations support duplex operation,
wherein the wireless transceiver is further configured to transmit a downlink data packet configured in a multi-user data format to at least one destined client station determined to support duplex operation while simultaneously receiving the one or more uplink data packets from the one or more client stations.

12. The network device of claim 11, wherein the processor is further configured to:
in response to determining that the one or more client stations support duplex operation, configure the downlink data packet as a downlink multi-user Physical Layer Convergence Protocol (PLCP) protocol data unit (PPDU) that is destined at the one or more client stations.

13. The network device of claim 11, wherein transmission of the one or more uplink data packets and transmission of the downlink data packet starts at a first same time and ends at a second same time.

14. The network device of claim 11, wherein the processor is further configured to:
in response to receiving the one or more uplink data packets, transmit a downlink acknowledgement message; and
receive an uplink acknowledgement message from the one of the one or more client stations in response to transmitting the downlink data packet, while transmitting the downlink acknowledgement message.

15. The network device of claim 11, wherein the processor is further configured to:
allocate a subchannel to the one of the one or more client stations that supports duplex transmission for both uplink transmission and downlink transmission.

16. The network device of claim 11, wherein the processor is further configured to:
allocate a first subchannel to the one of the one or more client stations that supports duplex transmission for uplink transmission; and
allocate a second subchannel different from the first subchannel to the one of the one or more client stations for downlink transmission.

17. The network device of claim 11, wherein the processor is further configured to:
defer transmission of the downlink data packet to the one of the one or more client stations until a first uplink multi-user data packet from the one of the one or more client stations is detected to avoid collision with a second uplink multi-user data packet from another client station.

18. The network device of claim 11, wherein the processor is further configured to:
perform a clear channel assessment checking before transmitting the downlink data packet configured in a multi-user data format to one of the one or more client stations to avoid collision with other uplink multi-user data packets from another client station.

19. The network device of claim 11, wherein the downlink data packet configured in a multi-user data format includes trigger information that solicits an uplink multi-user data aggregated medium access control protocol data unit (A-MPDU).

20. The network device of claim 19, wherein the processor is further configured to:
cascade duplex multi-user transmission by transmitting another downlink data packet while receiving another uplink transmission, after the transmission of the downlink data packet while receiving the one or more uplink data packets.

* * * * *